(12) United States Patent
Demuth et al.

(10) Patent No.: US 12,522,079 B2
(45) Date of Patent: Jan. 13, 2026

(54) BRAKING CONTROLLER FOR THE LINK CIRCUIT OF A DRIVE SYSTEM

(71) Applicant: Meritor Electric Vehicles Germany GmbH, Nuremberg (DE)

(72) Inventors: Thomas Demuth, Limbach-Oberfrohna (DE); Enrico Fuchs, Reinsdorf (DE); Timon Meier, Schwarzenberg (DE); Björn Bögel, Abenberg (DE)

(73) Assignee: Meritor Electric Vehicles Germany GmbH, Nuremberg (DE)

( * ) Notice: Subject to any disclaimer, the term of this patent is extended or adjusted under 35 U.S.C. 154(b) by 153 days.

(21) Appl. No.: 18/446,851

(22) Filed: Aug. 9, 2023

(65) Prior Publication Data

US 2024/0051400 A1 Feb. 15, 2024

(30) Foreign Application Priority Data

Aug. 10, 2022 (EP) ..................................... 22189666

(51) Int. Cl.
*B60L 7/12* (2006.01)
(52) U.S. Cl.
CPC ..................................... *B60L 7/12* (2013.01)
(58) Field of Classification Search
CPC ....................................................... B60L 7/12
USPC ............................................................ 318/87
See application file for complete search history.

(56) References Cited

U.S. PATENT DOCUMENTS

| 9,908,433 B2 * | 3/2018 | Amler ..................... B60L 7/003 |
| 2024/0051400 A1 * | 2/2024 | Demuth .................... B60L 7/22 |

FOREIGN PATENT DOCUMENTS

| CN | 109552056 A * | 4/2019 | ................ B60L 7/02 |
| DE | 102011087151 A1 | 5/2013 | |

OTHER PUBLICATIONS

European Search Report dated Dec. 23, 2022 for related European Appln. No. 22189666.5; 8 Pages.

* cited by examiner

*Primary Examiner* — Kawing Chan
(74) *Attorney, Agent, or Firm* — Brooks Kushman PC (57) ABSTRACT

A braking controller arrangement, a drive system, a vehicle, and a method of control. The braking controller arrangement includes a link circuit, a first semiconductor, a second semiconductor, a third semiconductor, a fourth semiconductor, and a resistor. The link circuit is electrically connected to terminals of a battery. The semiconductors are configured to be operated with a duty cycle of 50%.

6 Claims, 4 Drawing Sheets

BRAKING CONTROLLER FOR THE LINK CIRCUIT OF A DRIVE SYSTEM

TECHNICAL FIELD

The invention relates to a braking controller arrangement for a link circuit, wherein the link circuit has a first conductor and a second conductor, wherein the link circuit is configured for operation with a DC (direct current) voltage between the first conductor and the second conductor. Furthermore, the invention relates to a drive system comprising such a braking controller arrangement, and to a vehicle comprising such a drive system. The invention further relates to a method for the control of semiconductors of such a braking controller arrangement.

SUMMARY

A braking controller is used in a drive system of a vehicle, inter alia, to convert electrical energy that cannot be expediently utilized or stored into heat. An expedient utilization is for example feedback into a superordinate energy supply system, utilization in auxiliary facilities, or storage in an energy store. Precisely in the case of a vehicle, the kinetic energy of the vehicle during a braking process can be fed back into the link circuit of the drive system if the electrical machine, often also referred to as a motor, has feedback capability. Wear-free braking is thus possible.

In this case, the braking controller converts electrical energy into heat. The electrical energy is obtained by conversion of kinetic energy, for example, or arises on account of unequalized power balances in the link circuit. A resistor of the braking controller is used for the conversion into heat. In a customary embodiment nowadays, the braking controller consists of a series circuit formed by a switch and the resistor. If the link circuit voltage exceeds a previously defined limit value, then the switch closes and causes a current flow through the resistor, which thus converts electrical energy into heat.

The invention is based on the object of improving a braking controller.

This object is achieved by means of a braking controller arrangement for a link circuit, wherein the link circuit is configured for operation with a DC voltage between a first conductor and a second conductor, wherein the first conductor and the second conductor are each electrically connected directly to one of the terminals of a battery, wherein a first semiconductor is arranged between the first conductor and a first junction point, wherein the first semiconductor can switch a current from the first conductor to the first junction point, wherein a second semiconductor is arranged between the first junction point and the second conductor, wherein the second semiconductor can switch a current from the first junction point to the second conductor, wherein a third semiconductor is arranged between the first conductor and a second junction point, wherein the third semiconductor can switch a current from the first conductor to the second junction point, wherein a fourth semiconductor is arranged between the second junction point and the second conductor, wherein the fourth semiconductor can switch a current from the second junction point to the second conductor, wherein a resistor is arranged between the first junction point and the second junction point, wherein the semiconductors each have a semiconductor switch configured for switching a current in a first current direction through the respective semiconductor, wherein the semiconductors each have a diode configured for conducting a current in a current direction opposite to the first current direction through the respective semiconductor, wherein the first semiconductor, the second semiconductor, the third semiconductor and the fourth semiconductor are configured to be operated with a duty cycle of 50%. This object is further achieved by means of a drive system comprising such a braking controller arrangement, wherein the drive system comprises an electrical machine with feedback capability, which is electrically connected to the link circuit. Furthermore, this object is achieved by means of vehicle comprising such a drive system, wherein the drive system is configured to feed the electrical energy that arises during a braking process of the vehicle back into the link circuit.

Advantageous configurations of the invention are specified in the dependent claims.

The invention is based on the understanding, inter alia, that a braking controller can be improved if the resistor is controlled by four semiconductors. The four semiconductors, referred to as first, second, third and fourth semiconductor, are arranged in a so-called H-bridge, also referred to as bridge circuit, and the resistor forms the bridge branch.

The semiconductors can switch a current. That means that they can switch a current on and also off. A semiconductor capable of being turned off is therefore involved. One example of such a semiconductor is constituted by an IGBT module (e.g., insulated-gate bipolar transistor module). In this case, the semiconductors have a semiconductor switch. The semiconductor switch and thus the semiconductor can only switch a current in one direction. A current in the opposite direction through the semiconductor flows through a diode of the semiconductor and is therefore not switchable. That is to say that the current through the diode is neither capable of being switched on nor capable of being turned off.

The semiconductors have the switching states ON and OFF. These are opposite switching states. In other words, the switching state OFF is the switching state opposite to the switching state ON, and the switching state ON is the switching state opposite to the switching state OFF.

By means of the four semiconductors, the terminals of the resistor are connected to one of the two conductors of the link circuit, i.e., the first conductor or the second conductor. The link circuit voltage is present between the first conductor and the second conductor of the link circuit. Said voltage is a DC voltage. If the first junction point and the second junction point are connected to the same conductor of the link circuit as a result of corresponding switching actions of the semiconductors, no current flows through the resistor. However, if the two terminals of the resistor, i.e., the first junction point and the second junction point, are connected to different conductors of the link circuit as a result of corresponding switching actions of the semiconductors, a current flows through the resistor, which leads to electrical losses and thus to the conversion of electrical energy into heat.

The four semiconductors of the bridge circuit are operated with pulse width modulation in order to convert electrical energy into heat. That means that the first semiconductor, the second semiconductor, the third semiconductor and the fourth semiconductor are switched on and off periodically with a switching frequency. In this case, during operation, that is to say at least during the time when electrical energy is intended to be converted into heat, the first semiconductor and the second semiconductor assume different switching states. If the first semiconductor is switched on, then the second semiconductor is switched off, and vice versa. The same applies to the third semiconductor and the fourth semiconductor.

In this case, all the semiconductors are controlled with the same switching frequency. The duty cycle, also referred to as duty ratio or duty factor, indicates the ratio of the time duration in the switched-on state to the period duration of the periodic switching of the pulse width modulation (PWM). The four semiconductors are operated with a duty cycle of 50%. That means that the semiconductors are in the switching states ON and OFF for equal amounts of time. In the context of a consideration of tolerances, a duty cycle of 50% can also be assumed if the duty cycle is in a range of 48% to 52%.

The energy flow through the resistor can be attained by means of a temporal offset of the switching of the first semiconductor and the second semiconductor relative to the third semiconductor and the fourth semiconductor. This temporal offset is also referred to as a phase offset or phase shift. The greater the phase offset, the greater the power converted into heat by the resistor. The power is greatest if the third semiconductor assumes the opposite switching state with respect to the first semiconductor. This is then also referred to as a phase offset of 1800 or a phase shift of half the period duration of the switching actions.

The proposed method results in a pulsating AC current through the resistor with a mean value of zero.

If no electrical energy is to be converted into heat, the first semiconductor and the third semiconductor, and thus also the second semiconductor and the fourth semiconductor can be switched synchronously. Synchronous clocking is understood to mean that the corresponding semiconductors assume the same switching state as a result of simultaneous switching. This results in a phase offset of 0°. Alternatively, all the semiconductors can also be put into the switching state OFF if no electrical energy is to be converted into heat.

This arrangement and the method have proved to be advantageous in order to realize an accurate closed-loop control of the energy conversion into heat for a braking controller. Small powers indeed can be controlled by open-loop or closed-loop control particularly accurately by this method. Furthermore, this braking controller arrangement is particularly advantageous if a battery is connected directly to the link circuit and the DC voltage of the link circuit is present at the terminals of the battery. In order to definitely effect the energy exchange in particular during the feedback of electrical energy by means of an electrical machine connected to the link circuit and to protect the battery firstly against overloading and secondly against discharge at the time of the energy feedback, the proposed arrangement has proved to be advantageous since small amounts of energy are often to be converted into heat in this case. In the event of an excessively large amount of energy, the battery is discharged. This can undesirably increase the number of charging cycles. In other words, by virtue of the possible small amounts of energy that are converted into heat, the battery connected to the link circuit can be conserved in such a way that the lifetime of the battery increases significantly. In this case, the braking controller arrangement additionally allows the closed-loop control of the braking controller to be able to be carried out independently of the level of the DC voltage in the link circuit.

The particularly good closed-loop control and open-loop control of low powers results from the fact that the minimum power of the braking controller is no longer dependent on the minimum switched-on time of the semiconductors. In known braking controllers in which a switch controls the current through the resistor for example depending on the DC voltage in the link circuit, the current through the resistor cannot be switched off again until the minimum switched-on time of the semiconductor has elapsed. In this case, the electrical energy converted into heat is to a first approximation proportional to the switched-on duration. Consequently, the minimum switched-on time is also associated with the minimum amount of energy that is converted into heat each time the braking resistor is switched on. In applications in which a battery is connected directly to the link circuit, that can have the effect that besides the energy fed back, energy from the battery is also converted into heat or the battery does not fully exploit its charging capacity. It is likewise possible for the charging cycles of the battery to increase and thus for the lifetime of the battery to decrease. This reduction of lifetime can be counteracted by the proposed set-up with the proposed method since it is ensured that any arbitrarily small amount of energy can be converted into heat, without energy having to be drawn from the battery, for example on account of the minimum switched-on time.

Such a minimum amount of energy is not present in the case of the proposed braking controller arrangement. The semiconductors switch with a duty cycle of 50%, far away from the minimum switched-on duration. The power to be converted into heat is controlled by open-loop or closed-loop control with the aid of the phase offset and is thus independent of a minimum switched-on time of the semiconductors. Consequently, even arbitrarily small powers and electrical energy can be converted into heat by means of the proposed braking controller arrangement. This also affects the operation of the battery since alternating charging and discharging processes are thus reduced and the lifetime of the battery in the drive system thus increases as well.

Furthermore, the four semiconductors are all loaded uniformly by the duty ratio of 50% and are subject to the same aging. In comparison with nonuniform loading of the semiconductors, a significantly longer lifetime of the semiconductors can be achieved as a result since faster aging of one or a portion of the semiconductors is reliably avoided.

It has been found that the proposed set-up is a complex solution, in particular one capable of being applied from requirements for a vehicle. The semiconductors afford the possibility of definitely disconnecting the braking resistor from the link circuit in the case of a fault. A "definitely off" requirement is able to be realized by means of two switches in series. Requirements in respect of increased availability are thus able to be realized by means of the parallel control paths. In this case, with one control path (for example via the first and fourth semiconductors or via the second and third semiconductors), control in the conventional control scheme as a further operating mode is possible.

In one advantageous configuration of the invention, the semiconductors are each formed by an IGBT module. An IGBT module has a semiconductor switch and a diode arranged in antiparallel therewith. The IGBT module thus fulfils the switching behavior described above since it affords the possibility of switching on and off a current in a first current flow direction.

The IGBT module is subject to wear during operation, and this wear becomes apparent in a loss of lifetime. Precisely in the case of an IGBT, nonuniform loading can greatly decrease the lifetime of the module. By virtue of the duty cycle of 50% and the same switching frequency of all the IGBT modules as semiconductors, however, almost identical wear and thus low lifetime consumption of the IGBT modules are achieved. The highest wear of one of the semiconductors determines the loss of lifetime. Since the wear is identical or at least almost identical for all the IGBT modules by virtue of the proposed operating method, a particularly long lifetime results for the IGBT modules and thus for the braking controller arrangement.

In summary, standard IGBT modules can be used for the proposed set-up. The modules experience accelerated aging in the event of nonuniform loading of the integrated semiconductor switches. However, the proposed control method results in uniform loading of all the IGBT modules. The proposed control method enables the setting of extremely small effective duty factors and thus the consumption, i.e., the conversion into heat, of extremely small energies and medium powers.

BRIEF DESCRIPTION OF THE DRAWINGS

The invention is described and explained in greater detail below on the basis of the exemplary embodiments illustrated in the figures, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
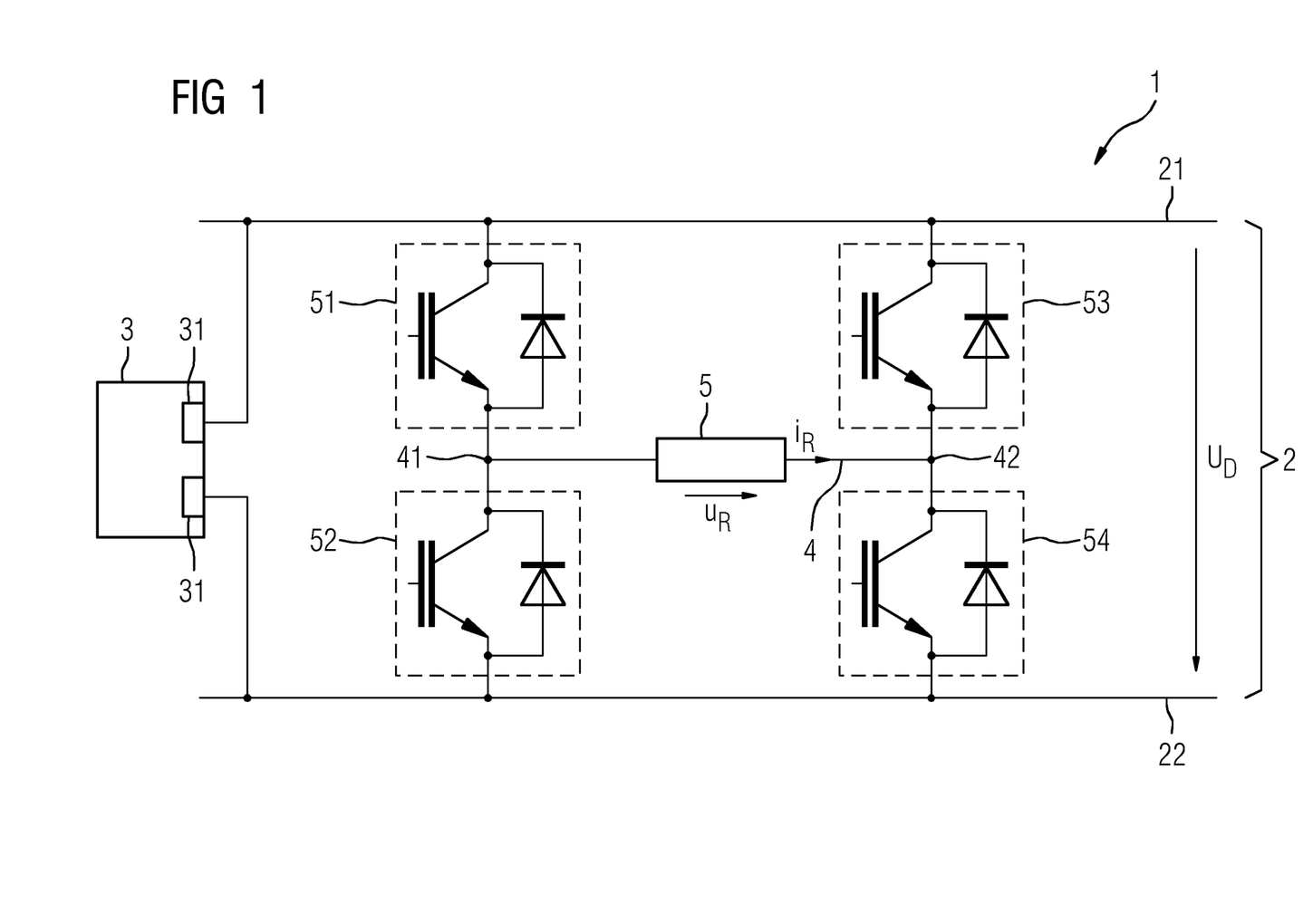
FIG. 1 shows a braking controller arrangement.

FIG. 1 shows the set-up of a proposed braking controller arrangement 1. The braking controller arrangement 1 has a link circuit 2. The DC voltage UD is present between a first conductor 21 and a second conductor 22 of the link circuit 2. A first semiconductor 51, a second semiconductor 52, a third semiconductor 53 and a fourth semiconductor 54 are arranged in an H-bridge, also referred to as bridge circuit. A resistor 5 is arranged in the bridge branch 4 of this H-bridge between a first junction point 41 and a second junction point 42. The current iR flows through the resistor 5 for the purpose of converting electrical energy into heat. In this case, the voltage uR is dropped across the resistor 5. A battery 3, by way of its terminals 31, is connected directly to the first conductor 21 and the second conductor 22 of the link circuit 2.

Figure 2:
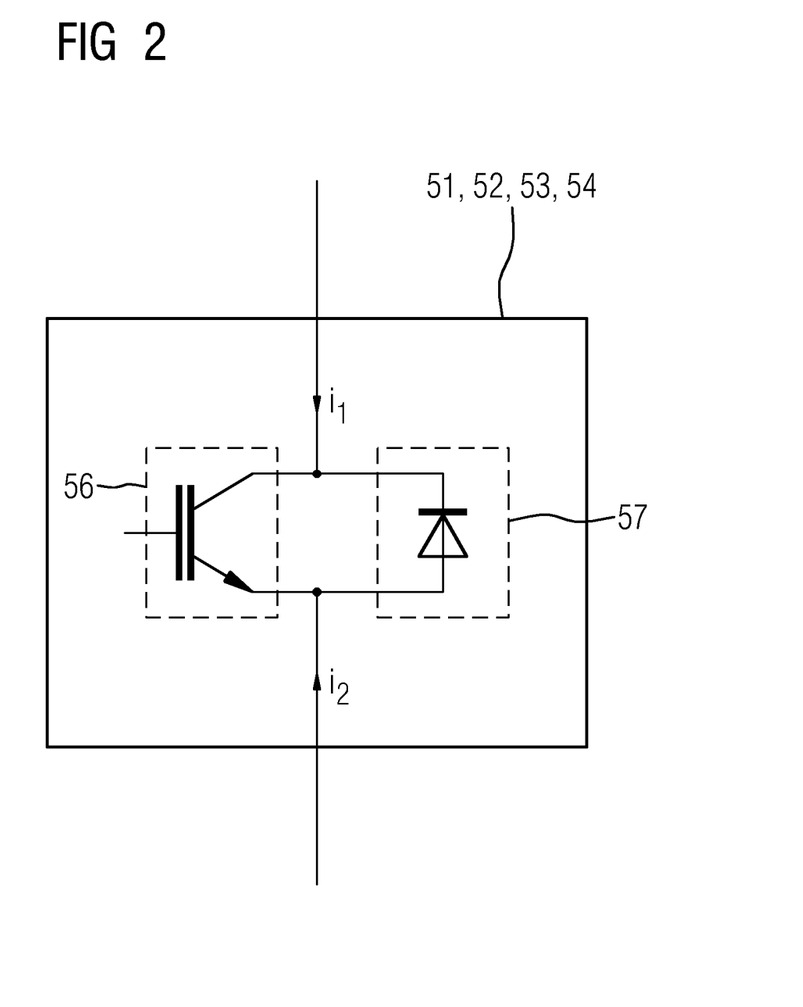
FIG. 2 shows the set-up of a semiconductor.

FIG. 2 shows the set-up of one of the semiconductors 51, 52, 53, 54. The semiconductor 51, 52, 53, 54 has a semiconductor switch 56, which can carry, i.e., conduct, and switch, i.e., switch on and switch off, a current i1 through the semiconductors 51, 52, 53, 54 in a first current direction. In parallel with said semiconductor switch 56, the semiconductor 51, 52, 53, 54 has a diode 57, which makes it possible to carry a current i2 in a current direction opposite to the first current direction. This current i2 in the current direction opposite to the first current direction is not switchable by the semiconductor 51, 52, 53, 54.

Figure 3:
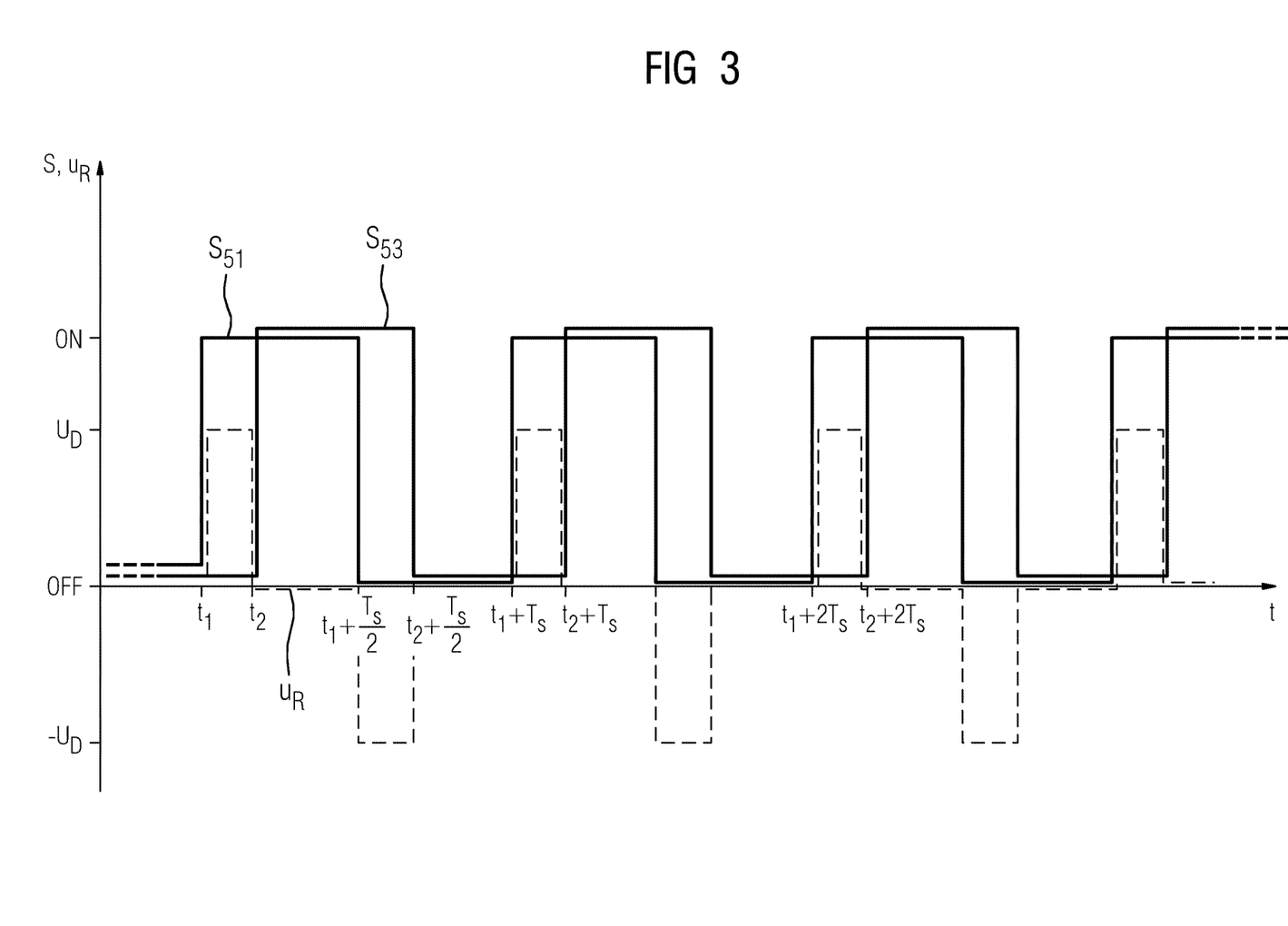
FIG. 3 shows the temporal profile of voltage and current at the braking resistor.

FIG. 3 shows a temporal profile of the switching states S51, S53 of the first semiconductor 51 and of the third semiconductor 53. These switching states S can assume the states ON (or conducting) or OFF (or blocking). Furthermore, the voltage uR across the resistor 5 is illustrated in a dashed fashion. In this case, the voltage uR shown versus time t in the illustration is dependent on the switching states of the semiconductors 51, 52, 53, 54. The switching functions S51 and S53 for the first semiconductor 51 and the third semiconductor 53, respectively, are therefore likewise illustrated. The switching functions can each assume the state ON or OFF. The switching functions S52 and S54 of the second semiconductor 52 and of the fourth semiconductor 54, respectively, are not illustrated for reasons of clarity, but are directly evident from the switching functions S51 and S53 since the second semiconductor 52 always assumes the opposite switching state in relation to the first semiconductor 51, and the four semiconductor 54 always assumes the opposite switching state in relation to the third semiconductor 53. At the times when the first semiconductor 51 is switched on, the second semiconductor 52 is switched off; at the times when the first semiconductor 51 is switched off, the second semiconductor 52 is switched on. The same applies, mutatis mutandis, to the third semiconductor 53 and the fourth semiconductor 54. The illustration reveals that the first and third semiconductors 51, 53 and thus also the second and fourth semiconductors 52, 54 are switched on for half of the period duration TS and are switched off for half of the period duration TS. This results in the duty cycle of 50%. In this case, the period duration TS is the period duration of the pulse width modulation, with which the semiconductors are switched or clocked.

A current iR through the resistor 5 flows whenever the switching functions S51 and S53 assume a different switching state and the positive or negative link circuit voltage UD or −UD is present at the resistor. This voltage causes a current flow iR proportional to the voltage uR. If the switching function S51 here assumes the state ON, and the switching function S53 assumes the state OFF, the voltage uR across the resistor 5 is positive and the current iR is thus positive as well. By contrast, if the switching function S51 assumes the state OFF and the switching function S53 assumes the state ON, the voltage uR across the resistor 5 is negative and the current iR is thus negative as well.

Consequently, it becomes clear that the voltage uR and the current iR through the resistor 5 and thus electrical power converted into heat by the resistor 5 are dependent on the switching delay t2−t1. In this case, the switching delay t2−t1 is independent of a minimum switched-on time of the semiconductors 51, 52, 53, 54, and so it is possible to realize arbitrarily small powers in the resistor 5 on account of arbitrarily small current durations of the current iR through the resistor 5.

In this case, the current iR is an AC current with a DC component of zero.

Figure 4:
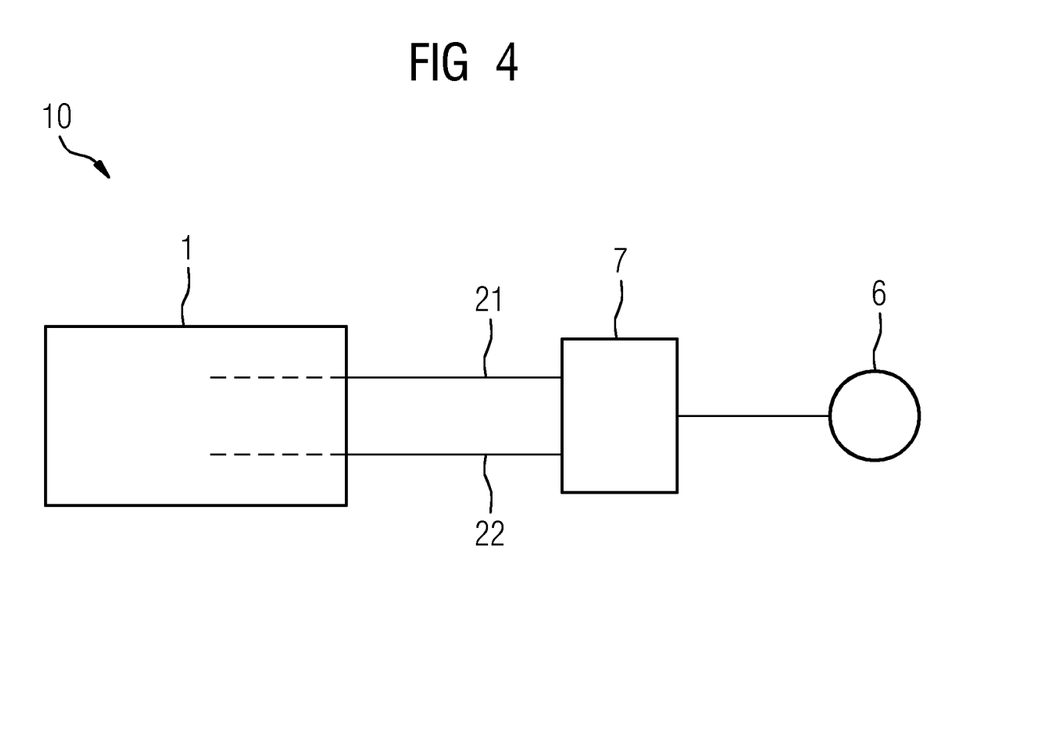
FIG. 4 shows a drive system.

FIG. 4 shows a drive system 10 comprising the proposed braking controller arrangement 1 and an electrical machine 6 with feedback capability, which is electrically connected to the first conductor 21 and the second conductor 22 of the link circuit 2 of the braking controller arrangement 1. In this case, the first conductor 21 and the second conductor 22 of the link circuit 2 extend beyond the braking controller arrangement 1. For open-loop or closed-loop control of the electrical machine 6, a controller 7 can be arranged between the link circuit 2 and the electrical machine 6. Depending on the embodiment of the controller 7, the electrical machine 6 can be designed as a DC motor, an AC motor or a threephase motor. If the electrical machine 6 is connected to the link circuit 2 directly, i.e., without a controller, then the electrical machine 6 is preferably embodied as a DC motor.

Figure 5:
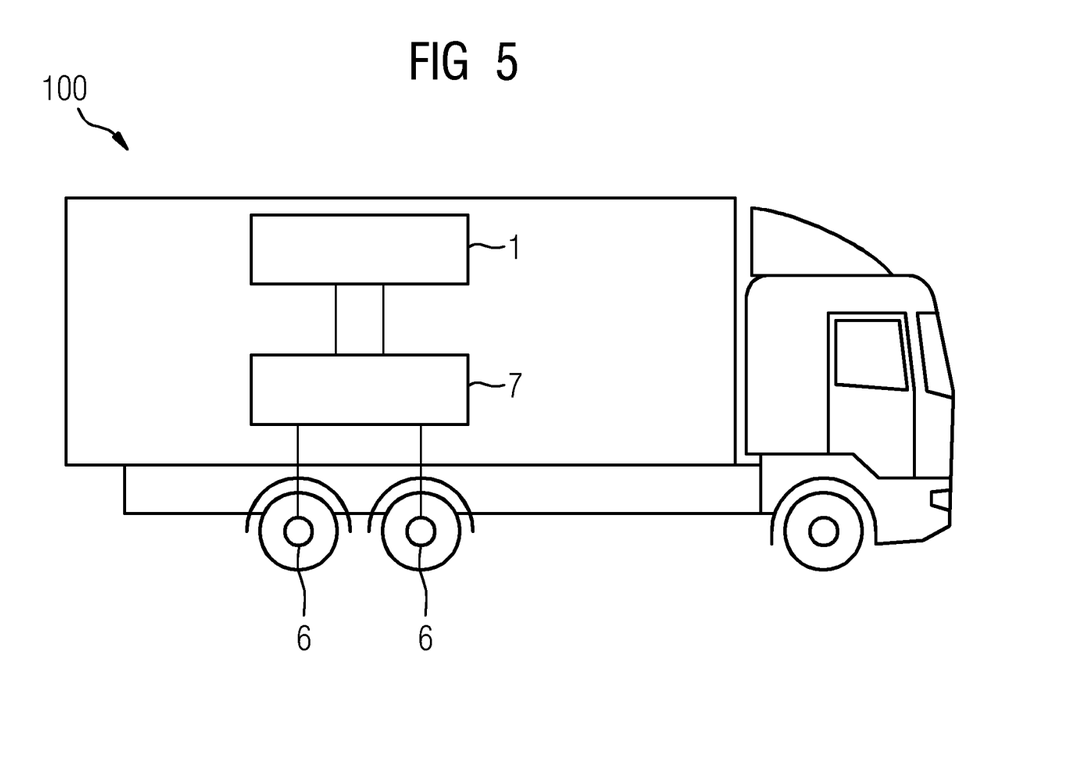
FIG. 5 shows a vehicle.

FIG. 5 shows a vehicle 100 comprising such a drive system 10. In this case, the driven wheels of the vehicle 100 are connected to the electrical machine 6 mechanically, for example via a shaft. The electrical machine 6 accelerates or decelerates the vehicle 100. The requisite energy or electrically obtained energy is exchanged with the link circuit 2 of the braking controller arrangement 1, to which the electrical machine 6 is connected directly or, as illustrated, via a controller 7. If the electrical energy from the feedback cannot be fully utilized, it is converted to heat with the aid of the braking controller arrangement 1. By comparison with a mechanical brake, for example using brake disks, this braking is free of wear.

In summary, the invention relates to a braking controller arrangement 1 for a link circuit 2. In order to improve the braking controller arrangement 1, it is proposed that the link circuit 2 is electrically connected directly to one of the terminals 31 of a battery 3, wherein the braking controller arrangement has four semiconductors 51, 52, 53, 54 arranged in a bridge circuit, wherein a resistor 5 is arranged in the bridge branch, wherein the semiconductors 51, 52, 53, 54 are configured to be operated with a duty cycle of 50%. The invention further relates to a drive system 10 comprising such a braking controller arrangement 1, wherein the drive system 10 comprises an electrical machine 6 with feedback capability. The invention furthermore relates to a vehicle 100 comprising such a drive system 10, wherein the drive system 10 is configured to feed the electrical energy that arises during a braking process of the vehicle 100 back into the link circuit 2. The invention furthermore relates to a method for the control of semiconductors 51, 52, 53, 54 of such a braking controller arrangement 1, wherein in a first operating mode the semiconductors 51, 52, 53, 54 are switched with a duty cycle of 50%, wherein the power to be converted into heat by the braking controller arrangement 1 is controlled by open-loop or closed-loop control by means of a switching delay.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A braking controller arrangement comprising:
a link circuit operable with a DC voltage between a first conductor and a second conductor, wherein the first conductor and the second conductor are directly electrically connected to a first terminal and a second terminal of a battery, respectively;
a first semiconductor arranged between the first conductor and a first junction point, wherein the first semiconductor is configured to switch current from the first conductor to the first junction point;
a second semiconductor arranged between the first junction point and the second conductor, wherein the second semiconductor is configured to switch current from the first junction point to the second conductor;
a third semiconductor arranged between the first conductor and a second junction point, wherein the third semiconductor is configured to switch current from the first conductor to the second junction point;
a fourth semiconductor arranged between the second junction point and the second conductor, wherein the fourth semiconductor is configured to switch current from the second junction point to the second conductor; and
a resistor arranged between the first junction point and the second junction point;
wherein the first semiconductor, the second semiconductor, the third semiconductor, and the fourth semiconductor each further comprise:
a semiconductor switch configured to switch current in a first current direction through the respective semiconductor; and
a diode configured to conduct current in a second current direction opposite to the first current direction through the respective semiconductor; and
wherein the first and third semiconductor, and also the second and fourth semiconductors, are switched on for half of a period duration and switched off for half of the period duration resulting in a duty cycle of 50%,
wherein the second semiconductor always assumes an opposite switching state with respect to the first semiconductor and the fourth semiconductor always assumes an opposite switching state with respect to the third semiconductor,
wherein an energy flow through the resistor is achieved by a temporal offset of the switching of the first semiconductor and the second semiconductor with respect to the third semiconductor and the fourth semiconductor, and
wherein the energy flow through the resistor is greatest when the third semiconductor assumes the opposite switching state of the first semiconductor.

2. The braking controller arrangement of claim 1 wherein the first semiconductor, the second semiconductor, the third semiconductor, and the fourth semiconductor are each formed by an IGBT module.

3. A drive system comprising:
a braking controller arrangement that comprises:
a link circuit operable with a DC voltage between a first conductor and a second conductor, wherein the first conductor and the second conductor are directly electrically connected to a first terminal and a second terminal of a battery, respectively;
a first semiconductor arranged between the first conductor and a first junction point, wherein the first semiconductor is configured to switch current from the first conductor to the first junction point;
a second semiconductor arranged between the first junction point and the second conductor, wherein the second semiconductor is configured to switch current from the first junction point to the second conductor;
a third semiconductor arranged between the first conductor and a second junction point, wherein the third semiconductor is configured to switch current from the first conductor to the second junction point;
a fourth semiconductor arranged between the second junction point and the second conductor, wherein the fourth semiconductor is configured to switch current from the second junction point to the second conductor; and
a resistor arranged between the first junction point and the second junction point;

wherein the first semiconductor, the second semiconductor, the third semiconductor, and the fourth semiconductor each further comprise:
a semiconductor switch configured to switch current in a first current direction through the respective semiconductor; and
a diode configured to conduct current in a second current direction opposite to the first current direction through the respective semiconductor; and
wherein the first and third semiconductor, and also the second and fourth semiconductors, are switched on for half of a period duration and switched off for half of the period duration resulting in a duty cycle of 50%,
wherein the second semiconductor always assumes an opposite switching state with respect to the first semiconductor and the fourth semiconductor always assumes an opposite switching state with respect to the third semiconductor,
wherein an energy flow through the resistor is achieved by a temporal offset of the switching of the first semiconductor and the second semiconductor with respect to the third semiconductor and the fourth semiconductor, and
wherein the energy flow through the resistor is greatest when the third semiconductor assumes the opposite switching state of the first semiconductor; and
an electrical machine with feedback capability, wherein the electrical machine is electrically connected to the link circuit.

4. A vehicle comprising:
a drive system that comprises:
a braking controller arrangement that comprises:
a link circuit operable with a DC voltage between a first conductor and a second conductor, wherein the first conductor and the second conductor are directly electrically connected to a first terminal and a second terminal of a battery, respectively;
a first semiconductor arranged between the first conductor and a first junction point, wherein the first semiconductor is configured to switch current from the first conductor to the first junction point;
a second semiconductor arranged between the first junction point and the second conductor, wherein the second semiconductor is configured to switch current from the first junction point to the second conductor;
a third semiconductor arranged between the first conductor and a second junction point, wherein the third semiconductor is configured to switch current from the first conductor to the second junction point;
a fourth semiconductor arranged between the second junction point and the second conductor, wherein the fourth semiconductor is configured to switch current from the second junction point to the second conductor; and
a resistor arranged between the first junction point and the second junction point;
wherein the first semiconductor, the second semiconductor, the third semiconductor, and the fourth semiconductor each further comprise:
a semiconductor switch configured to switch current in a first current direction through the respective semiconductor; and
a diode configured to conduct current in a second current direction opposite to the first current direction through the respective semiconductor; and
an electrical machine with feedback capability, wherein the electrical machine is electrically connected to the link circuit; and
wherein the first and third semiconductor, and also the second and fourth semiconductors, are switched on for half of a period duration and switched off for half of the period duration resulting in a duty cycle of 50%,
wherein the second semiconductor always assumes an opposite switching state with respect to the first semiconductor and the fourth semiconductor always assumes an opposite switching state with respect to the third semiconductor,
wherein an energy flow through the resistor is achieved by a temporal offset of the switching of the first semiconductor and the second semiconductor with respect to the third semiconductor and the fourth semiconductor,
wherein the energy flow through the resistor is greatest when the third semiconductor assumes the opposite switching state of the first semiconductor, and
wherein the drive system feeds electrical energy that arises during a braking of the vehicle back into the link circuit.

5. A method of controlling a braking controller arrangement, the braking controller arrangement comprising:
a link circuit operable with a DC voltage between a first conductor and a second conductor, wherein the first conductor and the second conductor are directly electrically connected to a first terminal and a second terminal of a battery, respectively, a first semiconductor arranged between the first conductor and a first junction point, wherein the first semiconductor is configured to switch current from the first conductor to the first junction point, a second semiconductor arranged between the first junction point and the second conductor, wherein the second semiconductor is configured to switch current from the first junction point to the second conductor, a third semiconductor arranged between the first conductor and a second junction point, wherein the third semiconductor is configured to switch current from the first conductor to the second junction point, a fourth semiconductor arranged between the second junction point and the second conductor, wherein the fourth semiconductor is configured to switch current from the second junction point to the second conductor, and a resistor arranged between the first junction point and the second junction point, wherein the first semiconductor, the second semiconductor, the third semiconductor, and the fourth semiconductor each further comprise a semiconductor switch configured to switch current in a first current direction through the respective semiconductor, and a diode configured to conduct current in a second current direction opposite to the first current direction through the respective semiconductor, the method comprising:
switching the first semiconductor, the second semiconductor, the third semiconductor, and the fourth semiconductor with a duty cycle of 50% when in a first operating mode, wherein the second semiconductor assumes an opposite switching state with respect to the first semiconductor, the fourth semiconductor assumes an opposite switching state with respect to the third semiconductor, and power to be converted into heat by the braking controller arrangement is controlled by open-loop or closed loop control by a switching delay of the third semiconductor relative to the first semiconductor, wherein switching of the first semiconductor and the second semiconductor with respect to the third semiconductor and the fourth semiconductor takes place with a phase shift;

wherein an energy flow through the resistor is achieved by a temporal offset of the switching of the first semiconductor and the second semiconductor with respect to the third semiconductor and the fourth semiconductor, and wherein the energy flow through the resistor is greatest when the third semiconductor assumes the opposite switching state of the first semiconductor.

6. The method of claim 5 further comprising switching on either the first semiconductor and the fourth semiconductor or the second semiconductor and the third semiconductor when the DC voltage of the link circuit exceeds a defined limit value when in a second operating mode.

* * * * *